US006819928B1

United States Patent
Hokao

(10) Patent No.: US 6,819,928 B1
(45) Date of Patent: Nov. 16, 2004

(54) SPEED ESIMATION FOR DIGITAL CORDLESS TELEPHONES

(75) Inventor: Tomoaki Hokao, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/392,428

(22) Filed: Sep. 9, 1999

(30) Foreign Application Priority Data

Sep. 10, 1998 (JP) .......................... 10/257027

(51) Int. Cl.⁷ .............................................. H04Q 7/20
(52) U.S. Cl. ................. 455/441; 455/226.2; 455/238.1
(58) Field of Search ................................ 455/440, 441, 455/444, 504–506, 238.1, 226.2, 226.4; 340/936; 342/350, 461, 104

(56) References Cited

U.S. PATENT DOCUMENTS

| | | | | |
|---|---|---|---|---|
| 5,396,253 A | * | 3/1995 | Chia ........................... | 455/441 |
| 5,548,806 A | * | 8/1996 | Yamaguchi et al. ......... | 455/441 |
| 5,787,348 A | * | 7/1998 | Willey et al. ................ | 455/441 |
| 5,870,666 A | * | 2/1999 | Tanaka et al. .............. | 455/67.1 |
| 5,983,104 A | * | 11/1999 | Wickman et al. ........... | 455/441 |
| 6,014,566 A | * | 1/2000 | Owada ........................ | 455/444 |
| 6,163,534 A | * | 12/2000 | Wang .......................... | 370/347 |
| 6,199,045 B1 | * | 3/2001 | Giniger et al. ................. | 705/1 |
| 6,259,919 B1 | * | 7/2001 | Suonvieri et al. ........... | 455/441 |

FOREIGN PATENT DOCUMENTS

| | | |
|---|---|---|
| JP | 8-307924 | 11/1996 |
| JP | 9-84093 | 3/1997 |
| JP | 10-108263 | 4/1998 |
| JP | 10-190557 | 7/1998 |
| JP | 10-257027 | 9/1998 |
| WO | WO 98/16079 | 4/1998 |
| WO | WO 98/59515 | 12/1998 |

* cited by examiner

Primary Examiner—Duc M. Nguyen
(74) Attorney, Agent, or Firm—Scully, Scott, Murphy & Presser

(57) ABSTRACT

In response to the resetting of a timer 6, a received electric field level measuring unit 3 measures the received electric field level in a predetermined time, and a control unit 4 computes the average level Vav in that time and compares this level Vav with a threshold level Vth. The unit 4 then computes a cycle period Tav of generation of levels in excess of the threshold level Vth in a predetermined time, and compares this cycle period Tav with a threshold cycle period Tth for high speed movement judgment as set in a memory 5. When Tav is shorter than Tth, the unit 4 judges and recognizes that the telephone set is in high speed movement, so that it can give an alarm to the person carying the telephone is set while at the same time changing the received sound level or automatically informing that the telephone set is in high speed movement.

11 Claims, 3 Drawing Sheets

SPEED ESIMATION FOR DIGITAL CORDLESS TELEPHONES

BACKGROUND OF THE INVENTION

The present invention relates to digital cordless telephone systems and sets and, more particularly, to a method of and a system for recognizing high speed movement of a digital cordless telephone set.

Prior art digital cordless telephone sets have been incapable of checking by themselves whether they are in high speed movement. Without capability of checking whether or not in high speed movement, it has been often the case that a measure against the occurrence of disability of communication due to the high speed movement is given up. Therefore, with a prior art digital cordless telephone set, for example, before driving a car the user himself or herself should make a prearrangement for prohibiting a termination call during driving the car. Also, in a train a great termination call sound may be generated to bother nearby people.

SUMMARY OF THE INVENTION

An object of the present invention is to provide a digital cordless telephone set and system capable of recognizing its high speed movement.

According to a first aspect of the present invention, there is provided a method of recognizing high speed movement of a digital cordless telephone set comprising:

a step of setting a reference speed of the digital cordless telephone set for high speed movement judgment; a step of setting a threshold of the variation cycle period of the received electric field level of the digital cordless telephone set corresponding to the reference speed for the high speed movement judgment; a step of measuring the variation cycle period of the received electric field level of the digital cordless telephone set in a predetermined time; and a step of recognizing that the digital cordless telephone set is in high seed movement when the measured variation cycle period of the received electric field level of the digital cordless telephone set becomes shorter than the threshold variation cycle period.

The step of setting the threshold of the variation cycle period of the received electric field level of the digital cordless telephone set corresponding to the reference speed of the high speed movement judgment includes: a step of measuring an average received electric field level of the digital cordless telephone set in a predetermined time; a step of counting number of times the received electric field level exceeds the average level as a threshold level in the predetermined time; and a step of computing number of times of exceeding the threshold in the predetermined time corresponding to the reference speed for the high speed movement judgment as a threshold number of times of exceeding the threshold for the high speed movement judgment; the step of measuring the variation cycle period of the received electric field level of the digital cordless telephone set is a step of counting the number of times the received electric field level exceeds the threshold level in the predetermined time periodically during movement; and the step of recognizing that the digital cordless telephone set is in high speed movement when the variation cycle period of the received electric field level of the digital cordless telephone set becomes shorter than the threshold variation cycle period is a step of recognizing that the digital cordless telephone set is in high speed movement when the exceeding times number count exceeds the threshold times number for the high speed movement judgment.

According to another aspect of the present invention, there is provided a digital cordless telephone set comprising: means for setting a reference speed of the digital cordless telephone set for high speed movement judgment; means for setting a threshold of the variation cycle period of the received electric field level of the digital cordless telephone set corresponding to the reference speed for the high speed movement judgment; means for measuring the variation cycle period of the received electric field level of the digital cordless telephone set in a predetermined time; and means for recognizing that the digital cordless telephone set is in high seed movement when the measured variation cycle period of the received electric field level of the digital cordless telephone set becomes shorter than the threshold variation cycle period.

The means for setting the threshold of the variation cycle period of the received electric field level of the digital cordless telephone set corresponding to the reference speed of the high speed movement judgment includes: means for measuring an average received electric field level of the digital cordless telephone set in a predetermined time; means for counting number of times the received electric field level exceeds the average level as a threshold level in the predetermined time; and means for computing number of times of exceeding the threshold in the predetermined time corresponding to the reference speed for the high speed movement judgment as a threshold number of times of exceeding the threshold for the high speed movement judgment; means for measuring the variation cycle period of the received electric field level of the digital cordless telephone set is a step of counting the number of times the received electric field level exceeds the threshold level in the predetermined time periodically during movement; and means for recognizing that the digital cordless telephone set is in high speed movement when the variation cycle period of the received electric field level of the digital cordless telephone set becomes shorter than the threshold variation cycle period is a step of recognizing that the digital cordless telephone set is in high speed movement when the exceeding times number count exceeds the threshold times number for the high speed movement judgment.

The high speed movement recognition system of the digital cordless telephone set includes an independent switch for starting the operation in response to the switching-on of a manual switch and stopping the operation in response to the switching-off of the manual switch.

The digital cordless telephone set further comprises means for automatically notifying the recognition of the high speed movement of the digital cordless telephone set to the person carrying the digital cordless telephone set.

According other aspect of the present invention, there is provided a mobile apparatus receiving radio wave transmitted from a plurality of radio wave transmission apparatuses which are located at a predetermined distance or distances, comprising: measuring circuit for measuring variation cycle period of strength of the received radio wave; and judging circuit for judging high speed movement state of the mobile apparatus when the variation cycle period of strength of the received radio wave is shorter than a threshold value determined based on the predetermined distance or distances.

The threshold value is determined on the basis of an average received radio wave strength in a predetermined time period. The threshold value is determined by adding a predetermined value to the average received radio wave strength.

According still other aspect of the present invention, there is provided a mobile apparatus receiving radio wave transmitted from a plurality of radio wave transmission apparatuses which are located at a predetermined distance or distances, comprising: measuring circuit for measuring strength of the received radio wave; counting circuit for counting number of times the measure strength is higher than a predetermined value; and judging circuit for judging high speed movement state of the mobile apparatus when the counted number is higher than a predetermined number.

According further aspect of the present invention, there is provided a judging method of high speed moving state of a mobile apparatus which receiving radio wave transmitted from a plurality of radio wave transmission apparatuses which are located at a predetermined distance or distances, comprising: measuring step for measuring variation cycle period of strength of the received radio wave; and judging step for judging high speed movement state of the mobile apparatus when the variation cycle period of strength of the received radio wave is shorter than a threshold value determined based on the predetermined distance or distances.

According to still further aspect of the present invention, there is provided a judging method of high speed moving state of a mobile apparatus which receiving radio wave transmitted from a plurality of radio wave transmission apparatuses which are located at a predetermined distance or distances, comprising: measuring step for measuring strength of the received radio wave; counting step for counting number of times the measure strength is higher than a predetermined value; and judging step for judging high speed movement state of the mobile apparatus when the counted number is higher than a predetermined number Other objects and features will be clarified from the following description with reference to attached drawings.

BRIEF DESCRIPTION OF THE DRAWINGS

Preferred embodiments of the present invention will now be described with reference to the drawings.

PREFERRED EMBODIMENTS OF THE INVENTION

Preferred embodiments of the present invention will now be described with reference to the drawings.

Figure 1:
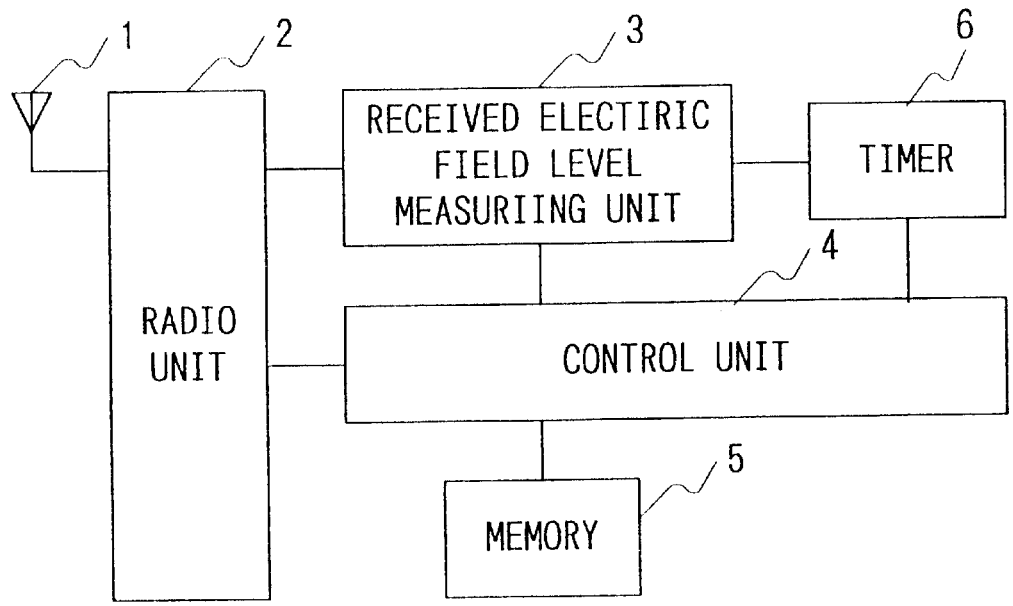
FIG. 1 is a block diagram showing an embodiment of the digital cordless telephone set according to the present invention.

FIG. 1 is a block diagram showing an embodiment of the digital cordless telephone set according to the present invention. As shown, the telephone set comprises an antenna 1, a radio unit 2, a received electric field level measuring unit 3, a control unit 4, a memory 5 and a timer 6.

The antenna 1 and the radio unit 2 are provided for transmitting and receiving radio waves to and from a base station, and the received electric field level measuring unit 3 measure the received electric field level. A received electric field level variation cycle period is also computed, and the control unit 4 checks whether the digital cordless telephone set is in high speed movement. This check is performed by comparing threshold data (i.e., received electric field level variation cycle period) preliminarily stored in the memory 5 and the actual received electric field level variation cycle period.

The received electric field level is increased whenever the digital cordless telephone set approaches each of a plurality of base stations which are located substantially at a predetermined distance interval, and the moving speed thus can be known by utilizing this cycle period. To this end, a high speed judgment reference speed of the digital cordless telephone set is set to, for instance, substantially 200 m/min, and a received electric field level variation cycle period of the telephone set corresponding to the high speed judgment reference speed is set to about 10 seconds. When the electric field level increase cycle period becomes shorter than 10 seconds, it is determined that this speed of movement is of high speed movement, and an alarm is given to the person carrying the telephone set.

For setting the threshold received electric field level variation cycle period of the digital cordless telephone set corresponding to the high speed judgment reference speed, the average received electric field level of the telephone set in 10 seconds is measured, and the threshold is determined on the basis of the average received electric field level. Judgment of the high speed moving state of the telephone set may be possible by counting number of times the received electric field level exceeds the average level in a predetermined time, for instance 10 seconds. It is also possible to utilize a specific recognition method to let the person carrying the digital cordless telephone set recognize high speed movement when the counted times of exceeding the average level exceeds the threshold exceeding times number.

Figure 3:
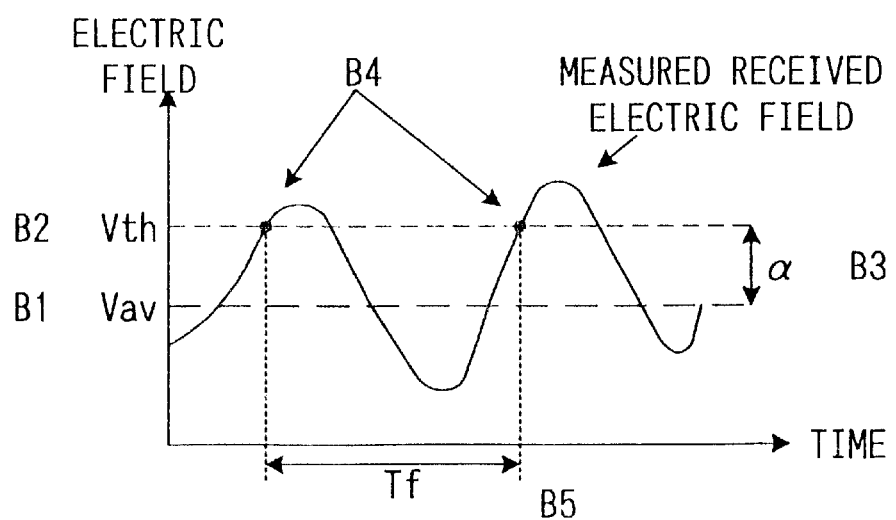
FIG. 3 is a drawing showing variations of received electric field level of the digital cordless telephone set.
Figure 2:
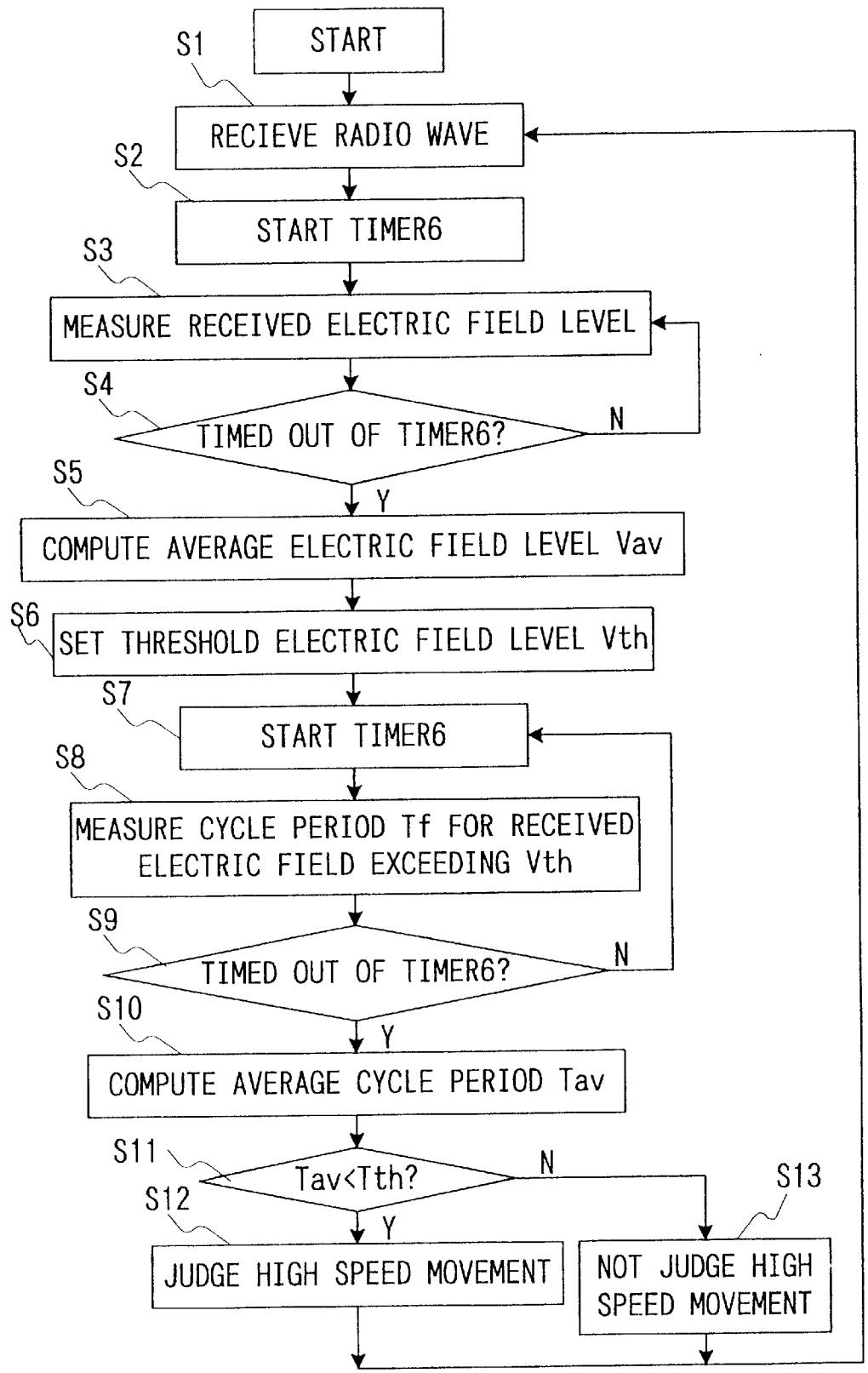
FIG. 2 is a flow chart of operation of the digital cordless telephone set shown in FIG. 1.

The operation of the embodiment will now be described with reference to FIGS. 1 to 3. When the digital cordless telephone set is receiving a radio wave from a base station with the antenna 1 and the radio unit 2 (step A1), the timer 6 is first reset and started (step A2), and the received electric field level measuring unit 3 measures the received electric field level (step A3) until the timer 6 is timed out after a predetermined time (step A4).

When the timer 6 has been timed out (step A4), the control unit 4 computes the average electric field level Vav (B1) (step A5), and sets a threshold electric field level Vth (B2) (step A6). As the level Vth a value obtained by adding a certain off-set value (B3) to Vav may be used. Alternatively, a table relating Vth and Vav may be stored in the memory 5.

Then, the timer 6 is reset and started (step A7), and the received electric field measuring unit 3 measures the received electric field level until the timer 6 is timed out. When the received electric field level exceeds the threshold electric field level Vth (B2), i.e., at point (B4), the cycle period Tf (B5) is measured (step A8).

When the timer 6 has been timed out (step A9), the average cycle period Tav is computed (step A10). Then, the control unit 4 compares the threshold cycle period Tth for high speed movement judgment stored in the memory 5 and the computed cycle period Tav (step A11). When Tav is shorter than Tth, it is judged that the digital cordless telephone set is in high speed movement. Otherwise, it is not judged that the telephone set is in high speed movement.

Figure 4:
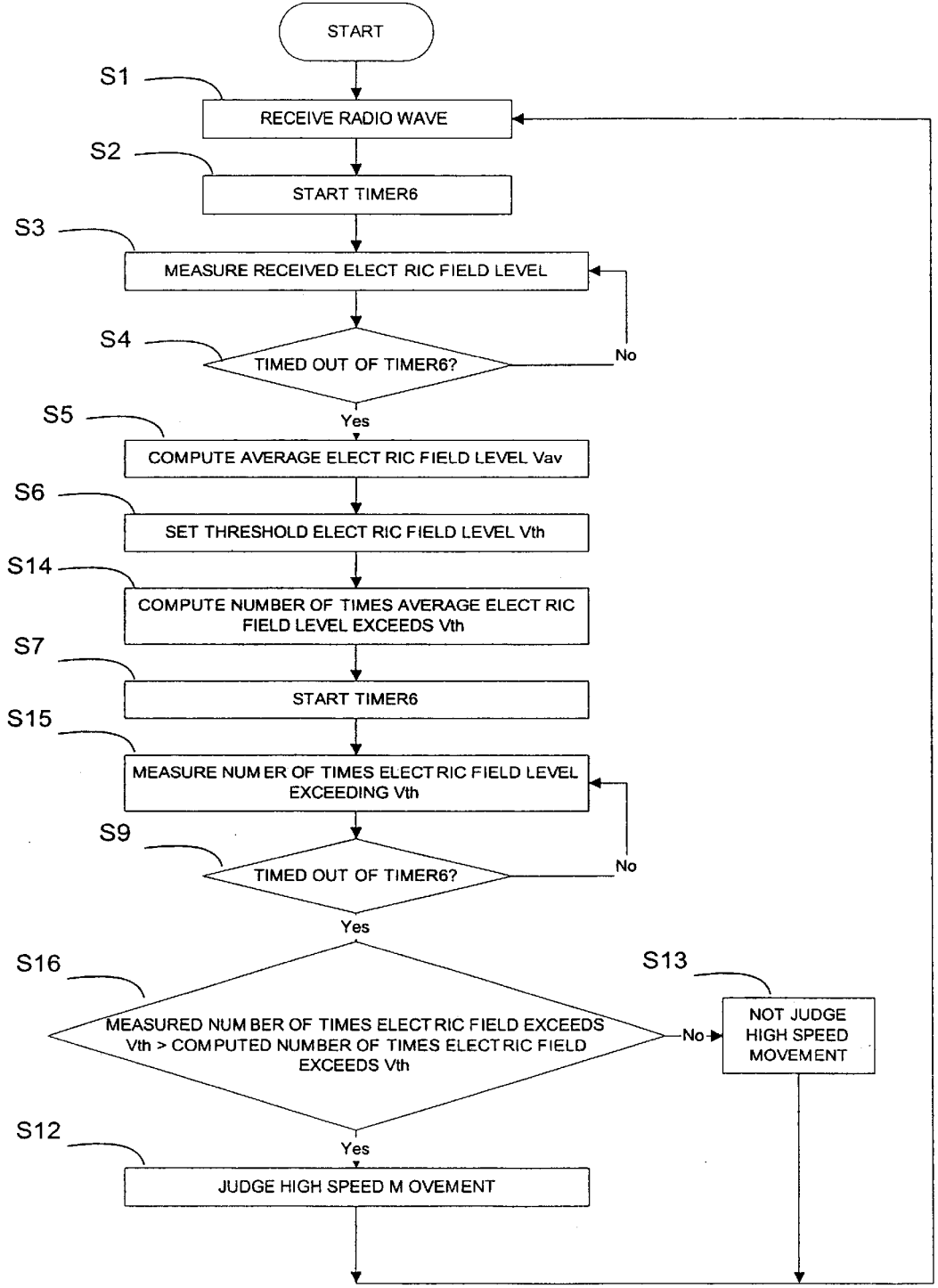
FIG. 4 is a flow chart of operation of the digital cordless telephone set shown in FIG. 1 according to a second embodiment.

The operation of the high speed movement recognition system may be started and stopped by a switch. However, it is rather desirable that the system is always held in operation. Aside from the above method in which the cycle period is compared, there is another method, referring to FIG. 4, in which the number of times the received electric field level has exceeded the threshold in a predetermined time is counted (S15) so as to recognize that the telephone set is in high speed movement when the count exceeds the high speed movement threshold (S16). This method can be more readily implemented. Furthermore, with the recognition of high speed movement a device for permitting the person carrying the digital cordless telephone set to automatically recognize that the telephone set is in high speed movement may be operated, or a device for stopping a termination call sound is stopped, or a sound signal indicative of the high speed movement (including announcement) may be sent back for the termination call.

According to the present invention, the following advantages are obtainable.

A first advantage of the present invention is that under the high speed movement condition the digital cordless telephone set can perform automatic control adapted to this condition. Specifically, when the person carrying the telephone set gets on a train, the If termination call sound volume is reduced, or switching to vibrator termination call is brought about. Furthermore, in response to a termination call during driving of a car, the service is switched to an absence telephone service, or the fact that the person is driving car is automatically notified to the opposite party. This is so because the digital cordless telephone set can make a check by itself as to whether it is in high speed movement by measuring the level variation cycle period of received electric fields from base stations.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A method of recognizing high speed movement of a digital cordless telephone set, the method comprising:
    measuring a received electric field level of the digital cordless telephone set in a predetermined time;
    setting a field strength threshold level by adding an offset value to an average of the received electric field level;
    setting a threshold variation cycle period of a received electric field level of the digital cordless telephone set corresponding to a reference speed for the high speed movement judgment;
    measuring the variation cycle period of the received electric field level of the digital cordless telephone set between successive times the received electric field level exceeds the field strength threshold level; and
    recognizing that the digital cordless telephone set is in high speed movement when the measured variation cycle period of the received electric field level of the digital cordless telephone set becomes shorter than the threshold variation cycle period.

2. The method according to claim 1, wherein the offset value is derived from a table relating the average of the received electric field level with a field strength threshold level.

3. The method according to claim 2, wherein the table is stored in a memory of the digital cordless telephone set.

4. A digital cordless telephone set comprising:
    means for measuring a received electric field level of the digital cordless telephone set in a predetermined time;
    means for setting a field strength threshold level by adding an offset value to an average of the received electric field level;
    means for setting a threshold variation cycle period of a received electric field level of the digital cordless telephone set corresponding to a reference speed for the high speed movement judgment;
    means for measuring the variation cycle period of the received electric field level of the digital cordless telephone set between successive times the received electric field level exceeds the field strength threshold level; and
    means for recognizing that the digital cordless telephone set is in high speed movement when the measured variation cycle period of the received electric field level of the digital cordless telephone set becomes shorter than the threshold variation cycle period.

5. The digital cordless telephone set according to claim 4, further comprising an independent switch for starting the high speed movement recognition operation in response to the switching-on of a manual switch and stopping the high speed movement recognition operation in response to the switching-off of the manual switch.

6. The digital cordless telephone set according to claim 4, further comprising means for automatically notifying the recognition of the high speed movement of the digital cordless telephone set to the person carrying the digital cordless telephone set.

7. A mobile apparatus receiving radio wave transmitted from a plurality of radio wave transmission apparatuses which are located at a predetermined distance or distances, comprising:
    measuring circuit for measuring variation cycle period of strength of the received radio wave; and
    judging circuit for judging high speed movement state of the mobile apparatus when the variation cycle period of the received radio wave is shorter than a threshold cycle period determined based on the predetermined distance or distances,
    wherein said variation cycle period of strength is determined by a time period that it takes for two successive received radio waves to exceed a field strength threshold, said field strength threshold value is determined by adding a predetermined value to an average received radio wave strength.

8. A method of judging a high speed moving state of a mobile apparatus which is receiving radio waves transmitted from a plurality of radio wave transmission apparatuses that are located at a predetermined distance or distances, comprising:
    measuring a variation cycle period of the strength of the received radio wave; and
    judging a high speed movement state of the mobile apparatus when the variation cycle period of strength of the received radio wave is shorter than a threshold cycle period determined based on the predetermined distance or distances, wherein said variation cycle period of strength is determined by a time period that it takes for two successive received radio waves to exceed a field strength threshold and said field strength threshold is determined by adding a predetermined value to the average received radio wave strength.

9. A method of recognizing high speed movement of a digital cordless telephone set, the method comprising:
    measuring a received electric field level of the digital cordless telephone set in a predetermined time;

setting a threshold variation cycle period of a received electric field level of the digital cordless telephone set corresponding to a reference speed for the high speed movement judgment;

measuring the variation cycle period of the received electric field level of the digital cordless telephone set between successive times the received electric field level exceeds a field strength threshold level, wherein said field strength threshold is a function of an average field strength level of the receive electric field and a predetermined offset value; and recognizing that the digital cordless telephone set is in high speed movement when the measured variation cycle period of the received electric field level of the digital cordless telephone set becomes shorter than the threshold variation cycle period.

10. A digital cordless telephone set comprising:

means for measuring a received electric field level of the digital cordless telephone set in a predetermined time;

means for setting a threshold variation cycle period of a received electric field level of the digital cordless telephone set corresponding to a reference speed for the high speed movement judgment;

means for measuring the variation cycle period of the received electric field level of the digital cordless telephone set between successive times the received electric field level exceeds a field strength threshold level wherein said field strength threshold is a function of an average field strength level of the receive electric field and a predetermined offset value; and means for recognizing that the digital cordless telephone set is in high speed movement when the measured variation cycle period of the received electric field level of the digital cordless telephone set becomes shorter than the threshold variation cycle period.

11. A mobile apparatus receiving radio wave transmitted from a plurality of radio wave transmission apparatuses which are located at a predetermined distance or distances, comprising:

measuring circuit for measuring variation cycle period of strength of the received radio wave; and judging circuit for judging high speed movement state of the mobile apparatus when the number of the received radio wave that exceed a given field strength within a predetermined time period is greater than a threshold value determined based on the predetermined distance or distances, wherein said number is determined by counting the number of received radio waves to exceed a field strength threshold within a predetermined time period, where said field strength threshold value is determined by adding a predetermined value to an average received radio wave strength.

* * * * *